(12) United States Patent
Brown

(10) Patent No.: US 9,139,305 B2
(45) Date of Patent: Sep. 22, 2015

(54) EVACUATION SYSTEMS

(71) Applicant: Air Cruisers Company, Wall Township, NJ (US)

(72) Inventor: Frank J. Brown, Bayville, NJ (US)

(73) Assignee: Air Cruisers Company, Wall Township, NJ (US)

( * ) Notice: Subject to any disclaimer, the term of this patent is extended or adjusted under 35 U.S.C. 154(b) by 28 days.

(21) Appl. No.: 14/176,311

(22) Filed: Feb. 10, 2014

(65) Prior Publication Data

US 2014/0224936 A1 Aug. 14, 2014

Related U.S. Application Data

(60) Provisional application No. 61/763,052, filed on Feb. 11, 2013.

(51) Int. Cl.
*B64D 25/14* (2006.01)

(52) U.S. Cl.
CPC ...................... *B64D 25/14* (2013.01)

(58) Field of Classification Search
CPC .................. B64D 25/14; B64C 1/32
USPC ........................................ 244/137.2
See application file for complete search history.

(56) References Cited

U.S. PATENT DOCUMENTS

| | | | | |
|---|---|---|---|---|
| 3,910,532 A * | 10/1975 | Fischer | ...................... | 244/137.2 |
| 5,102,070 A * | 4/1992 | Smialowicz et al. | ...... | 244/137.2 |
| 6,321,770 B1 * | 11/2001 | Hintzman et al. | ......... | 137/68.23 |
| 6,431,197 B2 * | 8/2002 | Hintzman et al. | .............. | 137/71 |
| 6,644,596 B1 * | 11/2003 | Jurlina et al. | ............... | 244/137.2 |
| 6,814,183 B2 * | 11/2004 | Horvath et al. | ................. | 182/48 |
| 7,467,764 B2 * | 12/2008 | Hintzman | ................... | 244/137.2 |
| 2004/0094671 A1 * | 5/2004 | Moro et al. | ................ | 244/137.2 |

* cited by examiner

*Primary Examiner* — Justin Benedik
(74) *Attorney, Agent, or Firm* — Kilpatrick Townsend & Stockton LLP; Dean W. Russell

(57) ABSTRACT

Evacuation systems including gravity-assist mechanisms are detailed. The systems may facilitate slide pack deployment from, e.g., aircraft doors by increasing an initial downward velocity of a slide pack. The increased velocity assists the pack in clearing an associated enclosure before jamming the opening door or twisting or flipping into an undesirable orientation.

5 Claims, 5 Drawing Sheets

EVACUATION SYSTEMS

CROSS-REFERENCE TO RELATED APPLICATION

This application claims the benefit of U.S. Provisional Patent Application Ser. No. 61/763,052, filed Feb. 11, 2013, and entitled "Aircraft Emergency Evacuation Systems Ejector Bag," the entire contents of which application are incorporated herein by this reference.

FIELD OF THE INVENTION

This application relates to systems for evacuating passenger vessels such as aircraft and more particularly, but not exclusively, to ejector bags for door-mounted inflatable evacuation slides.

BACKGROUND OF THE INVENTION

U.S. Pat. No. 7,467,764 to Hintzman discusses certain conventional emergency evacuation slide assemblies. As noted in the Hintzman patent:

> Door-mounted emergency evacuation slides are typically contained within an enclosure mounted to the interior surface of the aircraft exit door. Opening of the door in the "armed" position causes the slide to be pulled downward out of the enclosure into a position immediately outboard of and below the door exit opening. The evacuation slide is then rapidly inflated to form a structure sufficiently rigid to enable the airline passengers to escape.

See Hintzman, col. 1, 11. 14-21. The contents of the Hintzman patent are incorporated herein in their entirety by this reference.

Gravity alone usually supplies sufficient force to position a slide pack clear of the opening door. Thus, conventional evacuation systems require no additional assistive force to deploy slide packs from their enclosures as associated doors open. However, for doors configured for rapid opening (i.e. having rotational speeds generally exceeding 1.2 radians per second), gravity may not cause the slide packs to fall downward sufficiently quickly to avoid being dragged forward (outward) together with their enclosures so as to jam the doors or twist undesirably during deployment.

SUMMARY OF THE INVENTION

The present invention operates to furnish gravity-assisting forces to facilitate slide pack deployment. In particular, an ejector bag may be used to force a slide pack downward, increasing its initial downward velocity. The increased initial downward velocity assists the pack in clearing the enclosure before jamming the opening door or twisting or flipping into an undesirable orientation.

At least some versions of the invention include an inflator assembly connected to an ejector bag via flexible tubing. The inflator assembly may include a sealed, high-pressure cartridge of nitrogen operating as the inflation gas, although argon or other gases may be utilized instead. The inflator assembly also may comprise an inflation cable and a plunger configured to pierce the cartridge. When the inflation cable tenses, the plunger is caused to pierce the cartridge, allowing the nitrogen or other inflation gas to enter the flexible tubing, and thereby inflate the ejector bag.

The ejector bag preferably is positioned within and at the top of the packboard of the slide pack, in the area conventionally used for placement of a valve assembly and reservoir. As the ejector bag inflates, it bears against both a top tray of the packboard and the reservoir and valve assembly, forcing the slide pack downward. By increasing the initial velocity of the pack in this manner, it may fall faster than it would under influence solely of gravity, facilitating its clearance of the rapidly-rotating door.

Conventionally, a slide pack includes a pack release cable which tensions as the door opens and thus releases the lacing cover so the pack may fall. In presently-preferred versions of the invention, the inflation cable is configured to tension immediately after the pack release cable tenses so as to commence inflating the ejector bag as the lacing cover releases. This sequential tensioning may result from the inflation cable being slightly longer than the pack release cable, although other appropriate means of sequencing may be used instead.

In some embodiments of the invention, the ejector bag may have relatively small volume so as to inflate quickly to a pressure of approximately 1.5 psig. A spring optionally may be added further to bias the ejector bag downward. Persons skilled in the relevant art may include other downward-biasing components as well.

It thus is an optional, non-exclusive object of the present invention to provide gravity-assist devices to aid deployment of slide packs of evacuation systems.

It is another optional, non-exclusive object of the present invention to provide inflatable ejector bags configured to force slide packs downward, hence increasing their initial downward velocities above those attributable to gravity alone.

It is also an optional, non-exclusive object of the present invention to provide inflator assemblies for the ejector bags.

It is a further optional, non-exclusive object of the present invention to provide inflator assemblies having inflation cables of length slightly longer than corresponding pack release cables of the slide packs so as to cause non-concurrent (sequential) tensioning of the two types of cables.

Other objects, features, and advantages of the present invention will be apparent to those skilled in the appropriate field with reference to the remaining text and the drawings of this application.

DETAILED DESCRIPTION

Figure 1:
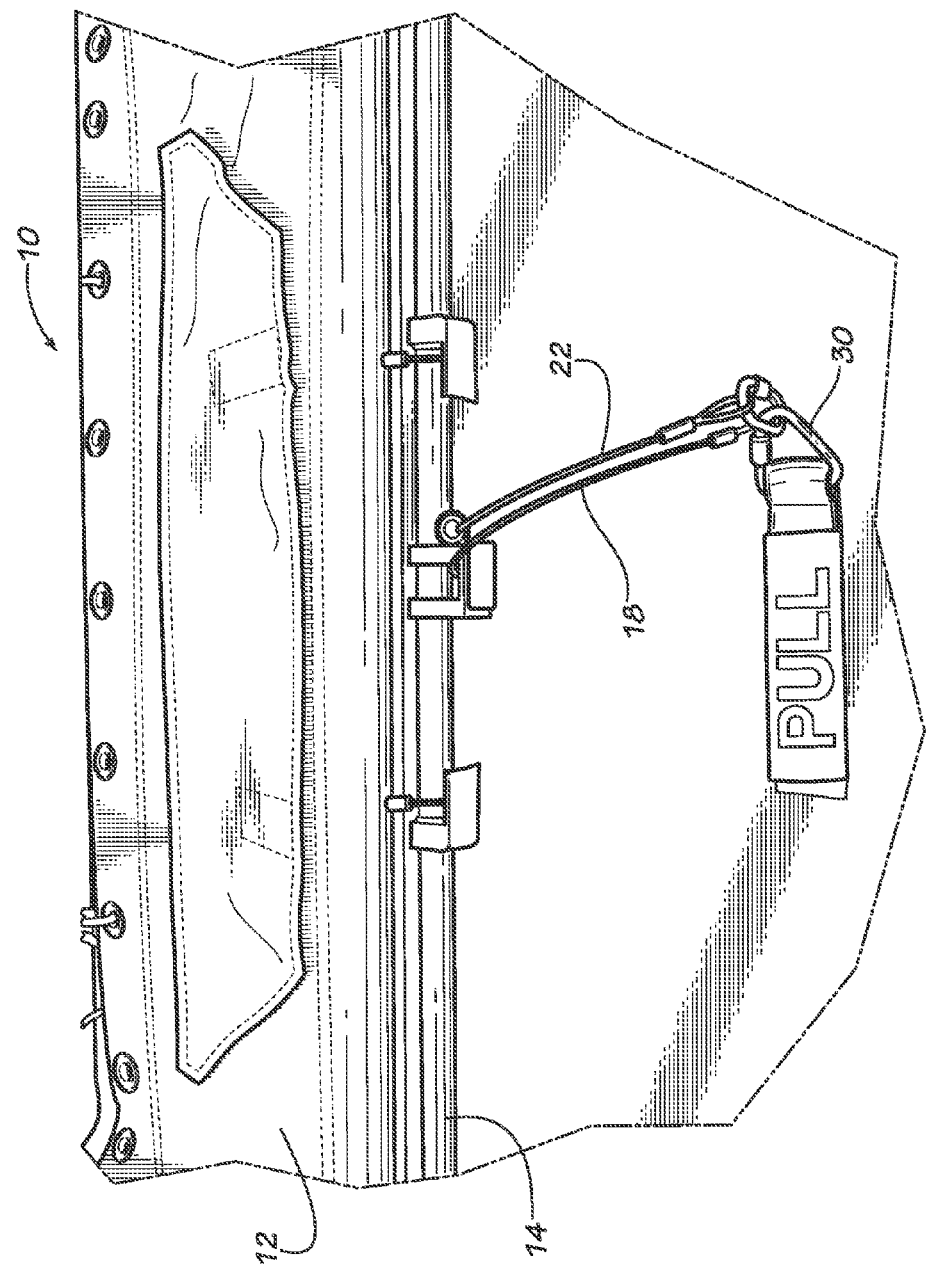
FIG. 1 schematically illustrates portions of a slide pack consistent with the present invention including pack releases and inflation cables.
Figure 2:
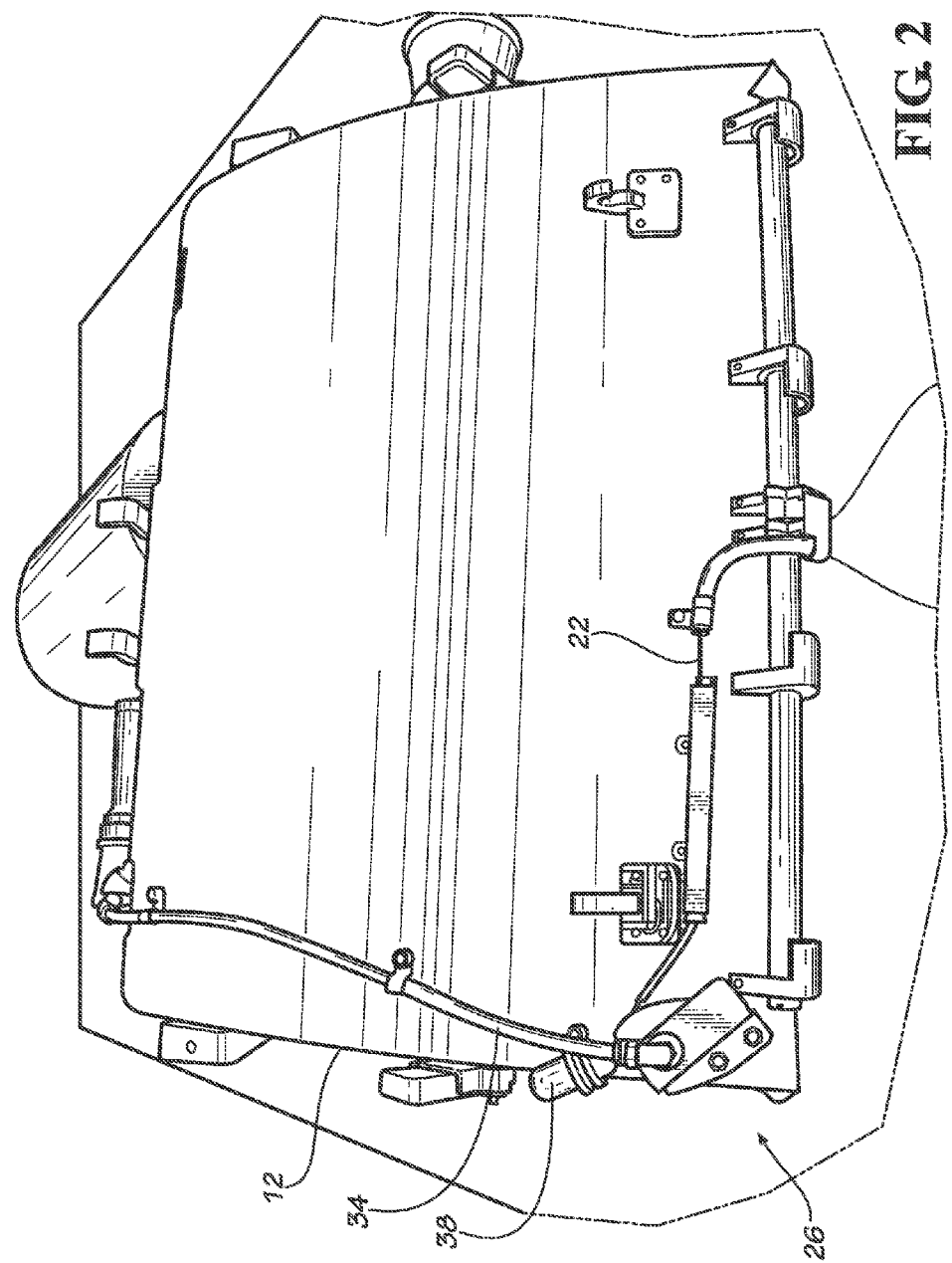
FIGS. 2-3 schematically illustrate portions of the slide pack of FIG. 1 including components of an inflator assembly.
Figure 3:
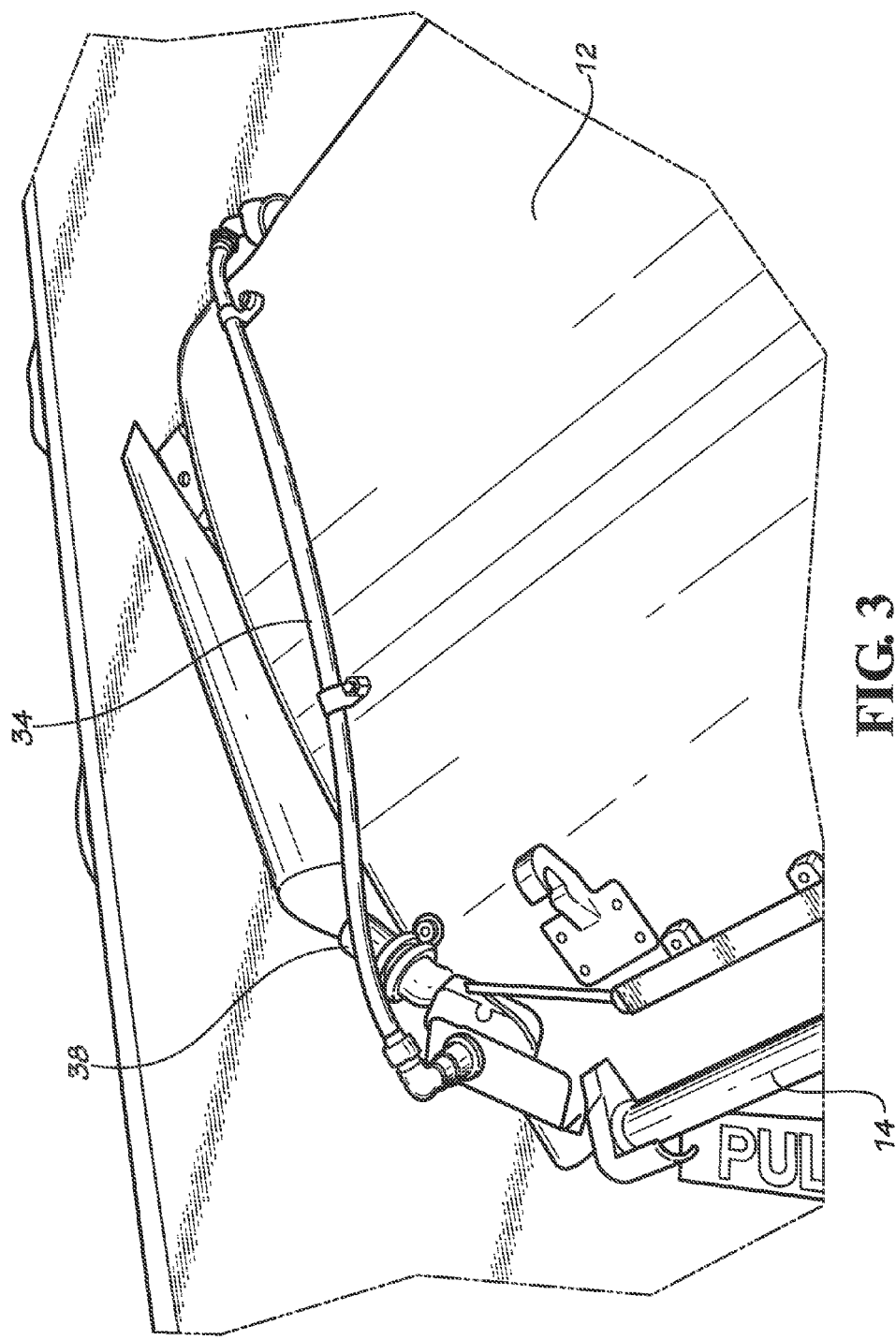
Figure 4:
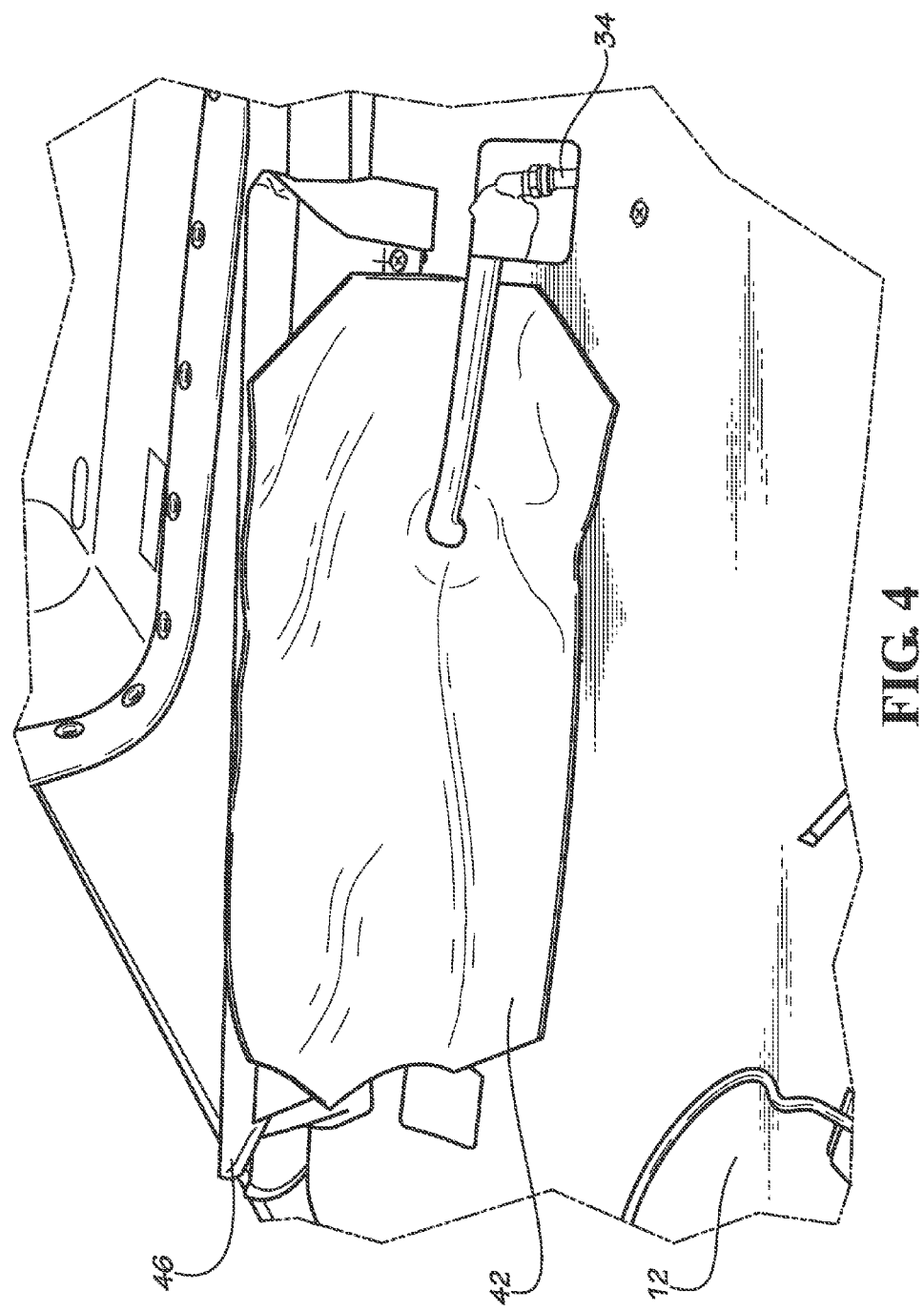
FIG. 4 schematically illustrates portions of the slide pack of FIG. 1 including an ejector bag.

Detailed in FIGS. 1-5 are portions of an exemplary slide pack 10. Pack 10 may include packboard 12 and release assembly 14 (or other structure) suitable for attachment to pack release cable 18 and inflation cable 22 of inflator assembly 26. Cables 18 and 22 are shown as being connected to ring 30; in turn, ring 30 preferably connects to a girt bar of an aircraft or any other mechanism or object suitable for tensioning cables 18 and 22 when pack 10 is to be deployed (as, for example, when an "armed" aircraft door opens). Pack 10 additionally may include an inflatable evacuation slide, although such a slide is not depicted in the schematic illustrations of FIGS. 1-5.

Inflator assembly 26 also may comprise tubing 34, cartridge 38, and a plunger or other mechanism for piercing or otherwise breaking the cartridge 38 as needed. Tubing 34 functions to convey inflation fluid from cartridge 38 to ejector bag 42 so as to inflate the bag 42. Tubing 34 preferably is flexible, although it need not always necessarily be so. Cartridge 38 advantageously may house nitrogen under substantial pressure and include a seal, wall, or other frangible component. Preferably, the plunger is configured to pierce cartridge 38 when inflation cable 22 becomes taut. And as noted earlier, inflation cable 22 may be configured to become taut slightly later in time than does pack release cable 18, so that ejector bag 42 commences inflation after a lacing cover associated with cable 18 releases.

Figure 5:
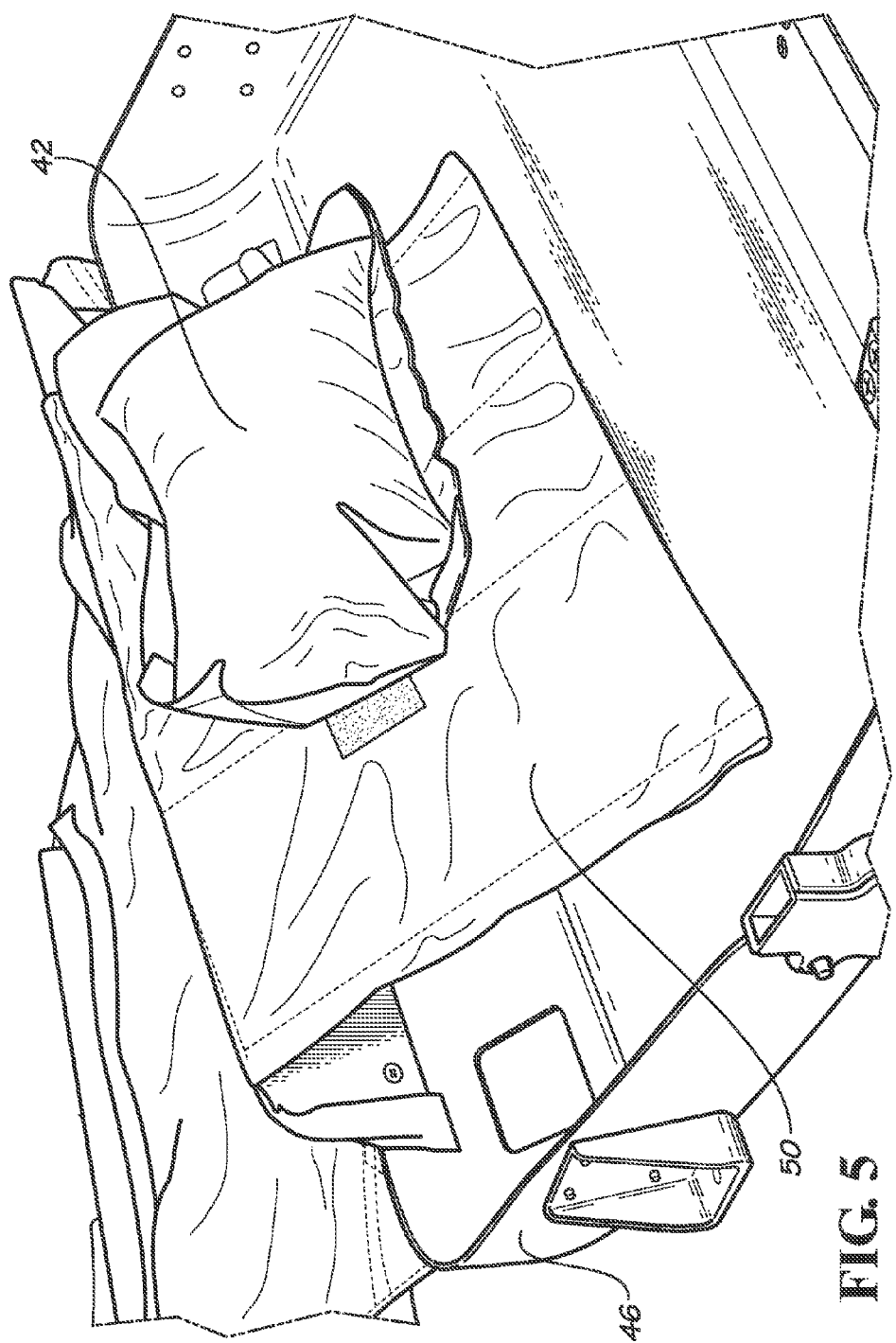
FIG. 5 schematically illustrates portions of the slide pack of FIG. 1 including the ejector bag of FIG. 4 and an optional spring.

Ejector bag 42 may be positioned within pack 10 at or near the top of packboard 12. As ejector bag 42 inflates, it bears against top tray 46 of packboard 12 and a reservoir and valve assembly, forcing slide pack 10 downward. This downward force assists gravity in causing pack 10 to fall, facilitating the pack 10 clearing a rapidly-opening door. FIG. 5 illustrates an optional plastic spring 50 which may also assist gravity in causing slide pack 10 to fall.

Tests of a mock-up door and slide pack with and without an ejector bag established that the ejector bag may increase the drop speed of the pack. A prototype ejector bag was fabricated and installed on a packboard of a mock-up of a forward aircraft door. The door has a rated opening speed of 1.22 radians per second and a hinge arm radius of 23.88 inches. The ejector bag had a volume of 160 cubic inches. Nitrogen, in a cartridge containing 2.8 grams, was used to inflate the ejector bag to a pressure of slightly less than 2.0 psig.

Drop time of the pack for a drop of sixteen inches (enough distance to clear the bustle/enclosure) was measured in frames of a high-speed camera. Whereas drop times of between 100-105 frames were recorded when no ejector bag was employed, the times diminished to between 77-88 frames when the ejector bag was used. Other tests established, for example, that an ejector bag inflated with argon also may decrease drop time of the pack.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An inflatable evacuation slide system configured for deployment upon opening of an aircraft door and comprising:
    a. a slide pack configured, upon deployment, to fall under influence of gravity; and
    b. means, comprising an inflatable ejector bag and an inflator assembly in fluid communication with the inflatable ejector bag, for increasing the falling velocity of the slide pack beyond that caused by gravity; and
   in which the inflator assembly comprises (i) a fluid-containing cartridge, (ii) tubing for conveying fluid from the fluid-containing cartridge to the inflatable ejector bag, (iii) means for piercing the fluid-containing cartridge, and (iv) an inflation cable configured, when tensioned, to operate the means for piercing.

2. An inflatable evacuation slide system according to claim 1 further comprising a pack release cable separate from the inflation cable.

3. An inflatable evacuation slide system according to claim 2 in which each of the inflation cable and the pack release cable having an effective length, with the effective length of the inflation cable being longer than the effective length of the pack release cable.

4. A method of configuring an evacuation system for a passenger aircraft so that a slide pack falls when a door of the passenger aircraft is opened, comprising opening the door thereby:
    a. tensioning a pack release cable of a slide pack so as to release a lacing cover; and
    b. after the pack release cable is tensioned, tensioning an inflation cable so as to inflate an ejector bag configured to increase an initial falling velocity of the slide pack.

5. An inflatable evacuation slide system according to claim 1 in which the fluid-containing cartridge contains nitrogen.

* * * * *